(12) United States Patent
Wang (10) Patent No.: US 8,902,909 B2
(45) Date of Patent: Dec. 2, 2014

(54) METHOD, SYSTEM, AND DEVICE FOR IMPLEMENTING SERVICE FORWARDING

(75) Inventor: Enfu Wang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 759 days.

(21) Appl. No.: 13/114,712

(22) Filed: May 24, 2011

(65) Prior Publication Data

US 2011/0222847 A1 Sep. 15, 2011

Related U.S. Application Data

(63) Continuation of application No. PCT/CN2009/074210, filed on Jun. 23, 2009.

(30) Foreign Application Priority Data

Nov. 24, 2008 (CN) .......................... 2008 1 0181080

(51) Int. Cl.
*H04L 12/28* (2006.01)

(52) U.S. Cl.
USPC ................. 370/401; 370/352; 398/49; 398/57

(58) Field of Classification Search
CPC .................................................. H04Q 11/0062
See application file for complete search history.

(56) References Cited

U.S. PATENT DOCUMENTS

| | | | | |
|---|---|---|---|---|
| 6,985,488 B2 * | 1/2006 | Pan et al. | ...................... | 370/395.3 |
| 7,417,950 B2 * | 8/2008 | Hofmeister et al. | ........... | 370/230 |
| 7,580,417 B2 * | 8/2009 | Ervin et al. | ..................... | 370/397 |
| 7,940,685 B1 * | 5/2011 | Breslau et al. | ................ | 370/251 |

(Continued)

FOREIGN PATENT DOCUMENTS

| | | |
|---|---|---|
| CN | 1436417 A | 8/2003 |
| CN | 1901497 A | 1/2007 |
| CN | 101013995 A | 8/2007 |
| CN | 101415005 A | 4/2009 |

OTHER PUBLICATIONS

Office Action issued in corresponding Chinese Patent Application No. 200810181080.X, mailed Mar. 22, 2012.

(Continued)

*Primary Examiner* — Phirin Sam
(74) *Attorney, Agent, or Firm* — Brinks Gilson & Lione (57) ABSTRACT

In the field of communications, a method, a system, and a device for implementing service forwarding are disclosed. The method includes: establishing an optical network tunnel between data communication devices; triggering physical interfaces of the data communication devices directly connected to an optical network to start a link layer protocol after the optical network tunnel is successfully established; performing, by the data communication devices, link layer negotiation through the optical network tunnel according to the link layer protocol; setting a link layer state between the data communication devices and a physical state of the physical interfaces to be valid after the link layer negotiation is performed successfully; and implementing, service forwarding, by the data communication devices through the optical network tunnel after the link layer state and the physical state of the physical interfaces are set to be valid. In this way, Internet Protocol (IP)/Multi-Protocol Label Switching (MPLS) service forwarding of the data communication devices is implemented, implementation complexity of bearing the IP/MPLS service over a Generalized Multi-Protocol Label Switching User-Network Interface (GMPLS UNI) tunnel is reduced, reconstruction on an IP/MPLS control plane and a forwarding plane is decreased, and forwarding performance is improved.

17 Claims, 4 Drawing Sheets

(56) References Cited

U.S. PATENT DOCUMENTS

| | | | |
|---|---|---|---|
| 8,023,518 B2* | 9/2011 | Tremblay et al. | 370/401 |
| 8,451,846 B1* | 5/2013 | Ayyangar | 370/395.5 |
| 2002/0030864 A1* | 3/2002 | Chaudhuri et al. | 359/110 |
| 2003/0031177 A1* | 2/2003 | Robidas et al. | 370/392 |
| 2003/0149718 A1 | 8/2003 | Theimer | |
| 2004/0037296 A1 | 2/2004 | Kim et al. | |
| 2006/0018324 A1* | 1/2006 | Nisar et al. | 370/395.51 |
| 2006/0209682 A1* | 9/2006 | Filsfils et al. | 370/219 |
| 2007/0053366 A1* | 3/2007 | Booth et al. | 370/400 |
| 2007/0086455 A1 | 4/2007 | Allan et al. | |
| 2008/0002975 A1 | 1/2008 | Vukovic et al. | |
| 2008/0123524 A1* | 5/2008 | Vasseur et al. | 370/228 |
| 2008/0198755 A1* | 8/2008 | Vasseur et al. | 370/248 |
| 2008/0232372 A1* | 9/2008 | Ong et al. | 370/392 |
| 2008/0273473 A1* | 11/2008 | Xu | 370/255 |
| 2008/0298311 A1* | 12/2008 | Zha et al. | 370/328 |
| 2009/0161681 A1* | 6/2009 | Madrahalli et al. | 370/401 |
| 2009/0182801 A1* | 7/2009 | Miyazaki et al. | 709/201 |
| 2009/0285574 A1* | 11/2009 | Liu | 398/2 |
| 2009/0296572 A1 | 12/2009 | Xiong | |

OTHER PUBLICATIONS

Zafar et al., "Address Resolution for GMPLS Controlled PSC Ethernet Interfaces". CCAMP Working Group internet draft, Jul. 9, 2007.

Zafar et al., "Address Resolution for GMPLS Controlled PSC Ethernet Interfaces". CCAMP Working Group internet draft, Jul. 9, 2007. (2).

Written Opinion of the International Searching Authority issued in corresponding PCT Patent Application No. PCT/CN2009/072410, mailed Oct. 1, 2009.

International Searching Authority issued in corresponding PCT Patent Application No. PCT/CN2009/072410, mailed Oct. 1, 2009.

Office Action issued in corresponding Chinese Patent Application No. 2008101081080.X, mailed Jan. 5, 2011.

Chinese Patent No. 101415005, issued on Apr. 17, 2013, granted in corresponding Chinese Patent Application No. 200810181080.X.

Extended European Search Report issued in corresponding European Patent Application No. 09827132.3, mailed Feb. 22, 2012.

Office Action issued in corresponding Chinese Patent Application No. 200810181080.X, mailed Jan. 5, 2011.

Zhi-jing et al., "Technique Research on Migration from MPLS to GMPLS" China Academic Journal Electronic Publishing House, Dec. 2006.

Iwata et al., "Global Open Ethernet Architecture for a Cost-Effective Scalable VPN Solution" IEICE Trans. Commun., vol. B, No. 1, Jan. 2004. XP-001541242.

Martini et al., "Encapsulation Methods for Transport of Ethernet over MPLS Networks" Network Working Group, Apr. 2006.

Bunch, "Auto-Negotiation and Gigabit Ethernet?" IEEE 802.3z Gigabit Ethernet Task Force, Nov. 5, 1996.

* cited by examiner

METHOD, SYSTEM, AND DEVICE FOR IMPLEMENTING SERVICE FORWARDING

CROSS-REFERENCE TO RELATED APPLICATIONS

This application is a continuation of International Application No. PCT/CN2009/072410, filed on Jun. 23, 2009, which claims priority to Chinese Patent Application No. 200810181080.X, filed on Nov. 24, 2008, both of which are hereby incorporated by reference in their entireties.

FIELD OF THE TECHNOLOGY

The present invention relates to the field of communications, and more particularly to a method, a system, and a device for implementing service forwarding.

BACKGROUND OF THE INVENTION

Multiprotocol Label Switching (MPLS) has gradually become a mainstream technology as it has capability of supporting multilayer label nesting and end-to-end Resource ReSerVation Protocol-Traffic Engineering (RSVP-TE), and good Quality of Service (QoS). However, the MPLS is incapable of supporting Time Division Multiplex (TDM) switching or Wavelength Division Multiplexing (WDM) switching.

With the development of technology, the problem is solved through extending RSVP-TE signaling, and the MPLS is further developed into the recent technology of Generalized Multiprotocol Label Switching (GMPLS).

When a data communication device in a data communication network, for example, a router (in the following illustration, a router is used as an example, but the data communication device applicable to the present invention is not limited to the router, for example, the data communication device may also be a three-layer switch or other devices with a routing function) supports the GMPLS, and all optical communication devices in an optical network support the GMPLS, the router and the optical communication devices can exchange transmission path information on a control plane. An optical communication device can establish a bi-directional GMPLS User-Network Interface (UNI) tunnel located between a source router and a destination router corresponding to a destination address according to information transmitted by the router and requirements of the router (such as the destination address, a bandwidth, and a QoS parameter). After the GMPLS UNI tunnel is successfully established, firstly, the tunnel is required to be declared to other routers in the network through the router in a manner of Forwarding Adjacency (FA).

Therefore, for other routers in the data communication network, the GMPLS UNI tunnel participates in routing computation and path selection of an MPLS tunnel after corresponding reconstruction on the control plane of a network protocol IP/MPLS, and thereby an IP/MPLS service is born over the GMPLS UNI tunnel. On a forwarding plane, a forwarding table generated by the GMPLS UNI tunnel is inserted in an existing IP/MPLS forwarding process. The forwarding table is used to indicate an actual physical egress interface of the GMPLS UNI tunnel, and put a label of the GMPLS UNI tunnel on a data packet, thereby bearing the IP/MPLS service over the GMPLS UNI tunnel and implementing forwarding of the IP/MPLS service. Eventually, the data packet sent from the router carries a layer of specific label of the GMPLS UNI tunnel (that is, a logical interface of the GMPLS UNI tunnel).

During the implementation of the present invention, the inventor finds that the prior art at least has the following disadvantages:

In one aspect, in order to bear an IP/MPLS service over a GMPLS UNI tunnel using a router in a data communication network, an IP/MPLS control plane is required to be reconstructed as follows: The GMPLS UNI tunnel is required to be declared out first in a manner of FA. An IP routing module in the router is required to perform new processing on the new tunnel during routing computation. An MPLS protocol module in the router is required to be reconstructed, so that the new tunnel participates in path selection of an MPLS tunnel.

In another aspect, a forwarding plane of the router is required to be reconstructed, that is, an existing forwarding process of IP/MPLS is required to be modified, and a process of inserting a GMPLS UNI tunnel table is added, which is very difficult for a forwarding engine based on an Application Specific Integrated Circuits (ASIC) chip in the router.

In further another aspect, on a source router, one more layer of label is required to be encapsulated on the forwarding plane, and one more level of forwarding table is required to be searched, thereby lowering forwarding performance; and on a receiving end, since one more layer of label is required to be processed, the forwarding performance is also affected.

SUMMARY OF THE INVENTION

After the GMPLS UNI tunnel is established for transmission between a data communication network and an optical network, in order to decrease implementation complexity of bearing an IP/MPLS service over a GMPLS UNI tunnel, reduce reconstruction on an IP/MPLS control plane and a forwarding plane, and improve forwarding performance, the present invention is directed to a method, a system, and a device for implementing service forwarding. The technical solution is described in the following.

In an embodiment, the present invention provides a method for implementing service forwarding, in which at least two data communication devices communicate with each other through an optical network. The method includes:

establishing an optical network tunnel between the data communication devices;

triggering physical interfaces directly connected to the optical network in the data communication devices to start a link layer protocol after the optical network tunnel is successfully established;

performing, by the data communication devices, link layer negotiation through the optical network tunnel according to the link layer protocol;

setting a link layer state between the data communication devices and a physical state of the physical interface to be valid after the link layer negotiation is successfully performed; and implementing, by the data communication devices, service forwarding, after the link layer state and the physical state of the physical interface are set to be valid.

In an embodiment, the present invention also provides a system for implementing service forwarding, which includes a first data communication device and a second data communication device, where the first data communication device and the second data communication device communicate with each other through an optical network.

The first data communication device is configured to establish an optical network tunnel between the first data communication device and the second data communication device; trigger a physical interface of the first data communication device directly connected to the optical network to start a link layer protocol after the optical network tunnel is successfully established; perform link layer negotiation with the second data communication device through the optical network tunnel according to the link layer protocol; set a link layer state and a physical state of the physical interface to be valid after the link layer negotiation is successfully performed; and send a service to the optical network tunnel through the physical interface after the link layer state and the physical state of the physical interface are set to be valid.

The second data communication device is configured to establish the optical network tunnel between the second data communication device and the first data communication device; trigger a physical interface of the second data communication device directly connected to the optical network to start the link layer protocol after the optical network tunnel is successfully established; perform the link layer negotiation with the first data communication device through the optical network tunnel according to the link layer protocol; set the link layer state and the physical state of the physical interface of the second data communication device to be valid after the link layer negotiation is successfully performed; and receive a service transmitted by the optical network tunnel through the physical interface of the second data communication device after the link layer state and the physical state of the physical interface are set to be valid.

In an embodiment, the present invention further provides a data communication device, which includes an establishing module, a starting module, a negotiating module, a setting module, and a sending module.

The establishing module is configured to establish an optical network tunnel between the data communication device and a peer data communication device.

The starting module is configured to trigger a physical interface of the data communication device directly connected to an optical network to start a link layer protocol after the establishing module successfully establishes the optical network tunnel.

The negotiating module is configured to perform link layer negotiation with the peer data communication device through the optical network tunnel established by the establishing module according to the link layer protocol started by the starting module.

The setting module is configured to set a link layer state and a physical state of the physical interface to be valid after the link layer negotiation is successfully performed by the negotiating module.

The sending module is configured to send a service to the optical network tunnel through the physical interface after the link layer state and the physical state of the physical interface are set to be valid by the setting module.

Beneficial effects of the technical solution according to the present invention are as follows:

After an optical network GMPLS UNI tunnel is successfully established, physical interfaces directly connected to the optical network in data communication devices are triggered to start the link layer protocol. The data communication devices perform link layer negotiation through the optical network tunnel according to the link layer protocol. A link layer state between the data communication devices and a physical state of the physical interfaces are set to be valid, after the link layer negotiation is successfully performed. The data communication devices implement service forwarding, after the link layer state and the physical state of physical interfaces are set to be valid. In this way, implementation complexity of bearing an IP/MPLS service over a GMPLS UNI tunnel is decreased, reconstruction on an IP/MPLS control plane and a forwarding plane is reduced, and forwarding performance is improved.

BRIEF DESCRIPTION OF THE DRAWINGS

To illustrate embodiments of the present invention more clearly, the accompanying drawings for describing the embodiments are introduced briefly below. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solution of the present invention is clearly and completely described below with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

In order to make the objectives, technical solution, and advantages of the present invention more comprehensible, the embodiments of the present invention are described in further detail below with reference to the accompanying drawings.

After the GMPLS UNI tunnel is established for transmission between a data communication network and an optical network, in order to decrease implementation complexity of bearing an IP/MPLS service over a GMPLS UNI tunnel, reduce reconstruction on an IP/MPLS control plane and a forwarding plane, and improve forwarding performance, the present invention provides a method for implementing service forwarding, in which at least two data communication devices communicate with each other through an optical network. The method includes:

establishing an optical network tunnel between the data communication devices;

triggering physical interfaces directly connected to the optical network in the data communication devices to start a link layer protocol after the optical network tunnel is successfully established;

performing, by the data communication devices, link layer negotiation through the optical network tunnel according to the link layer protocol;

setting a link layer state between the data communication devices and a physical state of the physical interfaces to be valid after the link layer negotiation is successfully performed; and implementing, by the data communication devices, service forwarding after the link layer state and the physical state of the physical interfaces are set to be valid.

Specifically, the optical network tunnel may be a GMPLS UNI tunnel.

Specifically, the link layer protocol includes a Point-to-Point Protocol (PPP) or an Ethernet link layer protocol.

Specifically, the service includes a network protocol IP service and/or an MPLS service.

In order to describe the method according to the embodiment of the present invention in detail, please refer to the following embodiments.

Embodiment 1

After the GMPLS UNI tunnel is established for transmission between a data communication network and an optical network, in order to decrease implementation complexity of bearing an IP/MPLS service over a GMPLS UNI tunnel, reduce reconstruction on an IP/MPLS control plane and a forwarding plane, and improve forwarding performance, this embodiment of the present invention provides a method for implementing service forwarding.

Figure 1:
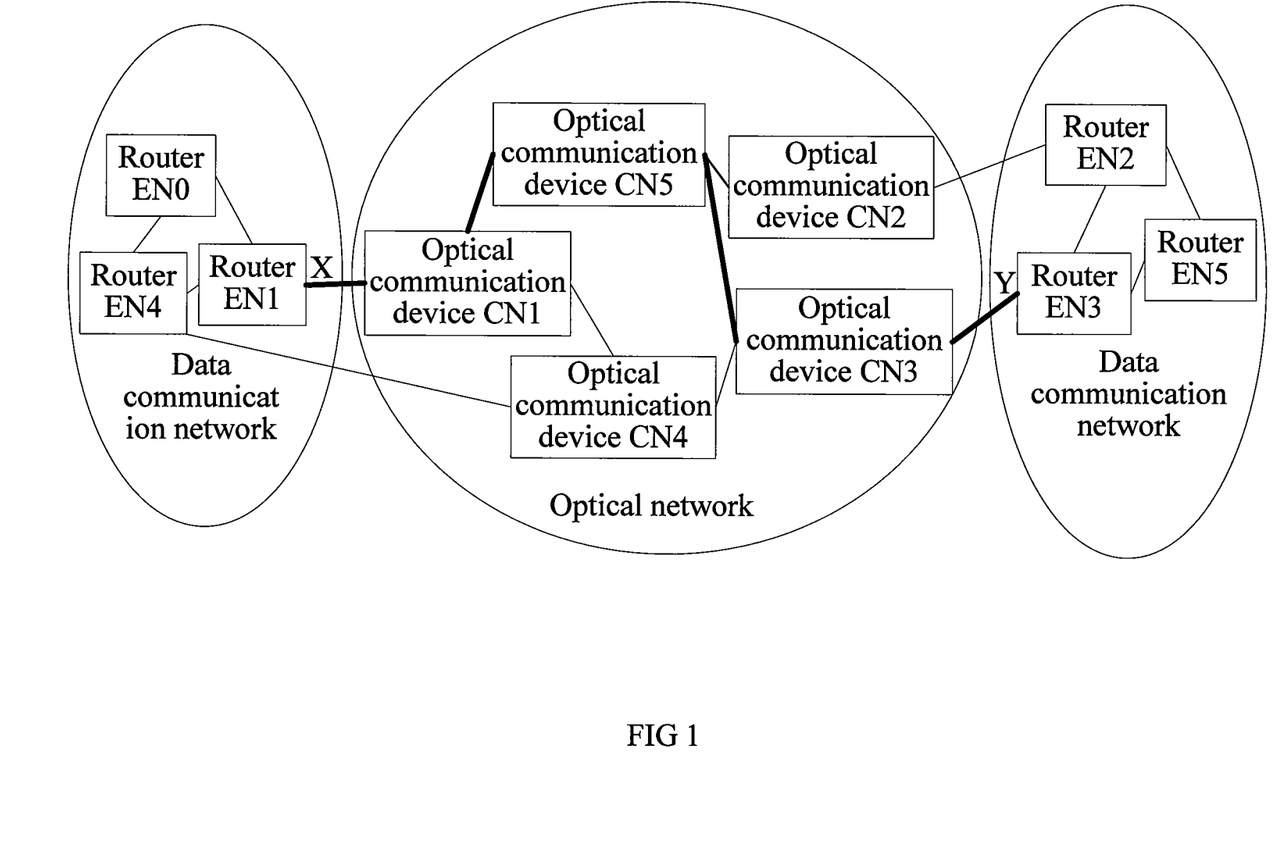
FIG. 1 is a schematic diagram of an established GMPLS UNI tunnel according to Embodiment 1 of the present invention.
Figure 2:
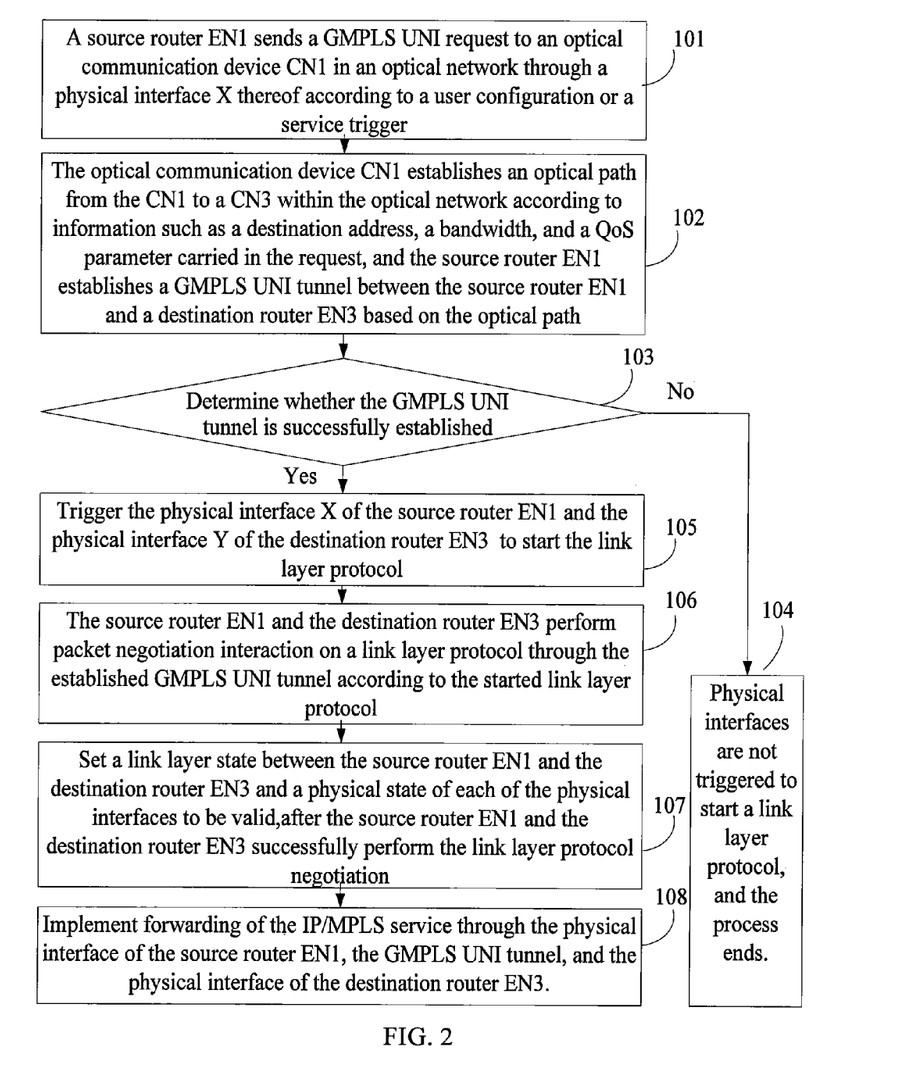
FIG. 2 is a schematic flow chart of a method for implementing service forwarding according to Embodiment 1 of the present invention.

FIG. 1 is a schematic view of an established GMPLS UNI tunnel according to this embodiment of the present invention. As shown in FIG. 1, heavy lines represent the GMPLS UNI tunnel, which starts from a router EN1 and ends at a router EN3. Taking FIG. 1 for example, the method according to the embodiment of the present invention is described in detail below. FIG. 2 is a schematic flow chart of the method for implementing service forwarding according to the embodiment of the present invention.

Step 101: A source router EN1 sends a GMPLS UNI request to an optical communication device CN1 in an optical network through a physical interface X of the source router according to a user configuration or a service trigger. The GMPLS UNI request carries such information as a destination address, a bandwidth, and a QoS parameter.

The router EN1 sends the GMPLS UNI request to devices in an adjacent optical network according to a user static configuration or a service trigger (such as a traffic flow trigger and a QoS trigger).

Because the router EN1 is physically and directly connected to the optical communication device CN1 in the optical network through the physical interface X of the router EN1, the GMPLS UNI request is sent to the optical communication device CN1.

Step 102: The optical communication device CN1 receives the GMPLS UNI request sent by the EN1, and establishes an optical path from the CN1 to a CN3 within the optical network according to the information, such as the destination address, the bandwidth, and the QoS parameter, carried in the request. The source router EN1 establishes a GMPLS UNI tunnel between the source router EN1 and the router EN3 corresponding to the destination address (simply called the destination router EN3) based on the optical path.

As shown in FIG. 1, the optical communication device CN1 receives the GMPLS UNI request sent by the EN1, and establishes the optical path from the CN1 to the CN3 within the optical network according to the information, such as the destination address, the bandwidth, and the QoS parameter, carried in the request. The source router EN1 establishes the bi-directional GMPLS UNI tunnel between the source router EN1 and the destination router EN3 based on the optical path according to the existing GMPLS UNI protocol (referring to RFC4028). The GMPLS UNI tunnel includes: The source router EN1 is connected with the CN1 through the physical interface X of the source router; in the optical network, the CN1 is connected with a CN5, and the CN5 is connected with the CN3; the CN3 is connected with a physical interface Y of the destination router EN3; in this way, the optical path between the source EN1 and the destination EN3 is established. The specific establishment process is defined in RFC4028 and therefore is not described in detail herein.

Step 103: Determine whether the GMPLS UNI tunnel between the source router EN1 and the destination EN3 is successfully established. If the GMPLS UNI tunnel is not established successfully, step 104 is performed; if the GMPLS UNI tunnel is established successfully, step 105 is performed.

Step 104: If the bi-directional GMPLS UNI tunnel is not successfully established, physical interfaces are not triggered to start a link layer protocol, and the process ends.

If the bi-directional GMPLS UNI tunnel is not successfully established, the physical interfaces are not triggered to start the link layer protocol. Persons skilled in the art can know that if the bi-directional GMPLS UNI tunnel is not successfully established, an attempt of establishing the GMPLS UNI tunnel will be initiated again.

Step 105: Trigger the physical interface X of the source router EN1 and the physical interface Y of the destination router EN3 to start the link layer protocol after the GMPLS UNI tunnel between the source router EN1 and the destination router EN3 is successfully established.

The physical interface X of the source router EN1 and the physical interface Y of the destination router EN3 are triggered to start the link layer protocol after the GMPLS UNI tunnel between the source router EN1 and the destination router EN3 is successfully established. The link layer protocol specifically includes a PPP and an Ethernet link layer protocol. In the embodiment of the present invention, the link layer protocol to be started is not limited; however, it should be guaranteed that the link layer protocol started by the source router EN1 is consistent to that started by the destination router EN3.

Step 106: The source router EN1 and the destination router EN3 perform packet negotiation interaction on about the link layer protocol through the established GMPLS UNI tunnel according to the started link layer protocol, after the physical interface X of the source router EN1 and the physical interface Y of the destination router EN3 start the link layer protocol. The details are described as follows:

Step 106A: The source router EN1 sends a link protocol request message through the physical interface X of the source router.

Step 106B: The link protocol request message is sent to the destination router EN3 through the established GMPLS UNI tunnel.

Step 106C: The destination router EN3 sends a link protocol response message through the physical interface Y of the destination router.

Step 106D: The link protocol response message is sent to the source router EN1 through the established GMPLS UNI tunnel.

Step 106E: The source router EN1 receives the link protocol response message transmitted by the GMPLS UNI tunnel through the physical interface X of the source router.

Through steps 106A to 106E, the source router EN1 and the destination router EN3 complete the interaction of protocol packets through the established GMPLS UNI tunnel according to the started link layer protocol, so the source router EN1 and the destination router EN3 successfully perform the link layer negotiation.

Step 107: Set a link layer state between the source router EN1 and the destination router EN3 and a physical state of each of the physical interfaces to be valid, after the source router EN1 and the destination router EN3 successfully perform the link layer protocol negotiation.

After the link layer state between the source router EN1 and the destination router EN3 and the physical state of each of the physical interfaces are set to be valid, a next hop of the source router EN1 is the destination router EN3.

Step 108: After the link layer state between the source router EN1 and the destination router EN3, the physical state of the physical interface X of the source router EN1, and the physical state of the physical interface Y of the destination router EN3 are all set to be valid (UP), the forwarding of the IP/MPLS service is implemented through the physical interface of the source router EN1, the GMPLS UNI tunnel, and the physical interface of the destination router EN3. The details include:

After the link layer state between the source router EN1 and the destination router EN3, the physical state of the physical interface X of the source router EN1, and the physical state of the physical interface Y of the destination router EN3 are all set to be valid (UP), the routers may use the physical interfaces connected to the GMPLS UNI tunnel as using common physical interfaces to forward IP/MPLS services without any reconstruction.

Figure 3:
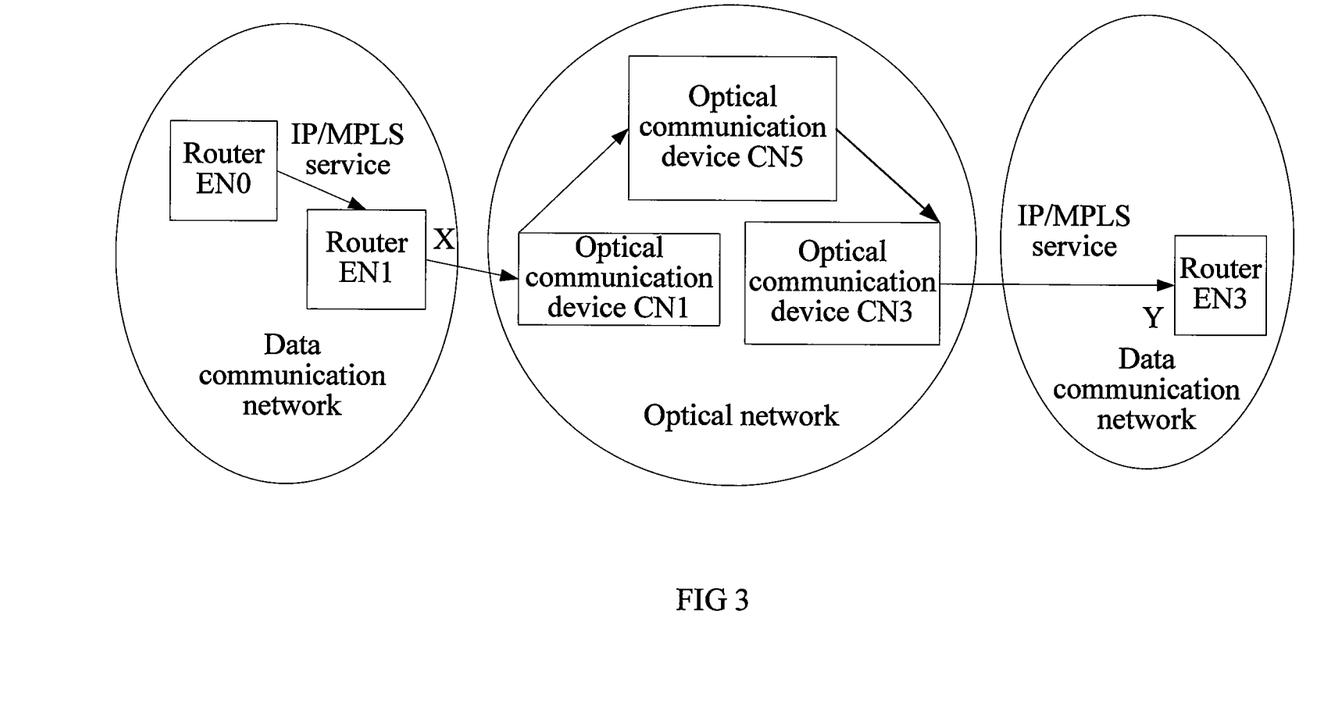
FIG. 3 is a schematic view of IP/MPLS service forwarding according to Embodiment 1 of the present invention.

FIG. 3 is a schematic view of IP/MPLS service forwarding according to the embodiment of the present invention. A router EN0 in the data communication network wants to forward an IP/MPLS service to the router EN3. The router EN0 performs a process of route learning, and knows that a next hop device of the router EN0 is the router EN1. That is, the router EN0 knows that a physical state of the physical interface of the router EN1 is valid by searching a forwarding table of the router EN0, and sends the service to the router EN1. In the same manner, the router EN1 performs a process of routing learning. Because a direct connection between the EN1 and the EN3 is established across the complex optical network after the execution of steps 101 to 107, the router EN1 knows that a next hop of the router EN1 is the router EN3.

Therefore, the router EN0 forwards the IP/MPLS service to the router EN1. After receiving the IP/MPLS service, the router EN1 sends the IP/MPLS service out through the physical interface X of the router EN1 directly connected to the optical network. The IP/MPLS service is transmitted to the router EN3 through the optical network. The router EN3 receives the IP/MPLS service through the physical interface Y of the router EN3 directly connected to the optical network. In this way, the forwarding of the IP/MPLS service from the router EN0 to the router EN3 is completed. During the whole process of the IP/MPLS service forwarding, the IP/MPLS service does not sense existence of the GMPLS UNI tunnel, and no reconstruction is required for the bearing over the GMPLS UNI tunnel. During the forwarding, no GMPLS label is required to be encapsulated on the routers.

Further, when the successfully established GMPLS UNI tunnel becomes unavailable (that is, the GMPLS UNI turns into the DOWN state) because of a failure during operation, the physical state of the physical interfaces, associated with the GMPLS UNI tunnel, of the routers in the data communication network is set to be invalid (that is, turned into DOWN) by triggering. Accordingly, the IP/MPLS service in the routers needs to be re-routed.

After the GMPLS UNI tunnel that becomes unavailable because of a failure recovers, the step of triggering the physical interfaces to start the link layer protocol is performed. For the process of setting the link layer state and the physical state of the physical interfaces to be valid after the link layer protocol negotiation is successfully performed, the operation is similar, and therefore is not described in detail herein.

Further, if the GMPLS UNI tunnel is not successfully established, the physical state of the physical interfaces cannot be set to be valid (UP), and in this case the physical interfaces are not available to the link layer protocol or the IP/MPLS service.

The foregoing embodiment takes the routers for example; however, the data communication devices in the present invention are not limited to the routers, and may also be, for example, a three-layer switch and other devices with a routing function.

To sum up, in the method according to the embodiment of the present invention, after the optical network GMPLS UNI tunnel is successfully established, the physical interfaces directly connected to the optical network in the data communication devices are triggered to start the link layer protocol. The data communication devices perform the link layer negotiation through the optical network tunnel according to the link layer protocol. After the link layer protocol negotiation is successfully performed, the link layer state between the data communication devices and the physical state of the physical interfaces are set to be valid. In this way, the forwarding of the IP/MPLS service is implemented, implementation complexity of bearing the IP/MPLS service over the GMPLS UNI tunnel is decreased, reconstruction on the IP/MPLS control plane and the forwarding plane is reduced, and the forwarding performance is improved.

Embodiment 2

Figure 4:
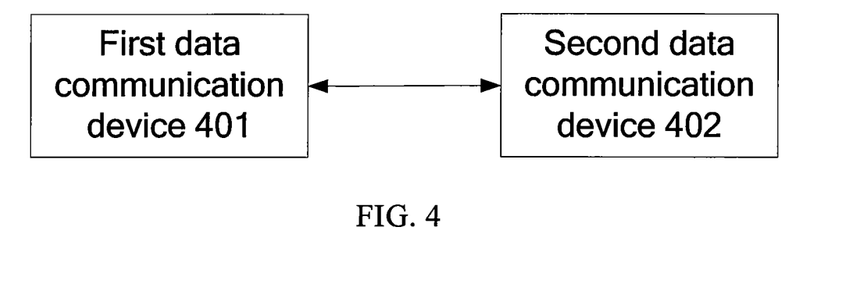
FIG. 4 is a schematic view of a system for implementing service forwarding according to Embodiment 2 of the present invention.

Referring to FIG. 4, this embodiment of the present invention provides a system for implementing service forwarding, which includes a first data communication device 401 and a second data communication device 402. The first data communication device 401 and the second data communication device 402 communication with each other through an optical network.

The first data communication device 401 is configured to establish an optical network tunnel between the first data communication device 401 and the second data communication device 402; trigger a physical interface of the first data communication device directly connected to the optical network to start a link layer protocol after the optical network tunnel is successfully established; perform link layer negotiation with the second data communication device 402 through the optical network tunnel according to the link layer protocol; set a link layer state and a physical state of the physical interface to be valid after the link layer protocol negotiation is successfully performed; and send a service to the optical network tunnel through the physical interface after the link layer state and the physical state of the physical interface are set to be valid.

The second data communication device 402 is configured to establish the optical network tunnel between the second data communication device 402 and the first data communication device 401; trigger a physical interface of the second data communication device directly connected to the optical network to start the link layer protocol after the optical network tunnel is successfully established; perform the link layer negotiation with the first data communication device 401 through the optical network tunnel according to the link layer protocol; set the link layer state and the physical state of the physical interface of the second data communication device to be valid after the link layer protocol negotiation is successfully performed; and receive the service transmitted by the optical network tunnel through the physical interface of the second data communication device after the link layer state and the physical state of the physical interface are set to be valid.

Further, the system according to this embodiment of the present invention may further include an optical network.

The optical network is configured to establish the optical network tunnel between the first data communication device 401 and the second data communication device 402; completes the link layer protocol negotiation between the first data communication device 401 and the second data communication device 402 through the optical network tunnel; receive the service sent over the physical interface of the first data communication device 401, and transmit the service to the second data communication device 402.

Specifically, the optical network tunnel may be a GMPLS UNI tunnel.

Specifically, the link layer protocol includes a PPP or an Ethernet link layer protocol.

Specifically, the service includes a network protocol IP service and/or an MPLS service.

To sum up, in the system according to this embodiment of the present invention, after the optical network GMPLS UNI tunnel is successfully established, the physical interfaces directly connected to the optical network in the data communication devices are triggered to start the link layer protocol. The data communication devices perform the link layer negotiation through the optical network tunnel according to the link layer protocol. After the link layer protocol negotiation is successfully performed, the link layer state between the data communication devices and the physical state of the physical interfaces are set to be valid. In this way, the forwarding of the IP/MPLS service is implemented, implementation complexity of bearing the IP/MPLS service over the GMPLS UNI tunnel is decreased, reconstruction on the IP/MPLS control plane and the forwarding plane is reduced, and the forwarding performance is improved.

Embodiment 3

Figure 5:
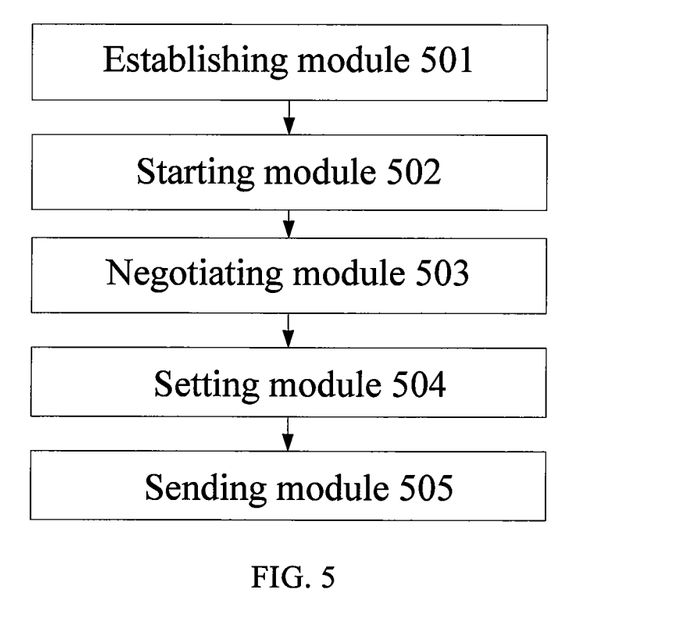
FIG. 5 is a schematic view of a data communication device according to Embodiment 3 of the present invention.

Referring to FIG. 5, this embodiment of the present invention provides a data communication device, which includes an establishing module 501, a starting module 502, a negotiating module 503, a setting module 504, and a sending module 505.

The establishing module 501 is configured to establish an optical network tunnel between the data communication device and a peer data communication device.

The starting module 502 is configured to trigger a physical interface of the data communication device directly connected to an optical network to start a link layer protocol after the establishing module successfully establishes the optical network tunnel.

The negotiating module 503 is configured to perform link layer negotiation with the peer data communication device through the optical network tunnel established by the establishing module 501 according to the link layer protocol started by the starting module 502.

The setting module 504 is configured to set a link layer state and a physical state of the physical interface to be valid after the link layer negotiation is successfully performed by the negotiating module 503.

The sending module 505 is configured to send a service to the optical network tunnel through the physical interface after the link layer state and the physical state of the physical interface are set to be valid by the setting module 504; that is, send a packet of the service to the peer data communication device through the optical network tunnel.

Further, the data communication device according to this embodiment of the present invention further includes a receiving module.

The receiving module is configured to receive the service transmitted by the optical network tunnel established by the establishing module 501 through the physical interface set by the setting module 504.

Specifically, the optical network tunnel may be a GMPLS UNI tunnel.

Specifically, the link layer protocol includes a PPP or an Ethernet link layer protocol.

Specifically, the service includes a network protocol IP service and/or an MPLS service.

To sum up, with the data communication device according to this embodiment of the present invention, after the optical network GMPLS UNI tunnel is successfully established, the physical interface directly connected to the optical network in the data communication device is triggered to start the link layer protocol. The data communication device performs the link layer negotiation through the optical network tunnel according to the link layer protocol. After the link layer protocol negotiation is successfully performed, the link layer state between the data communication devices and the physical state of the physical interface are set to be valid. In this way, the forwarding of the IP/MPLS service is implemented, implementation complexity of bearing the IP/MPLS service over the GMPLS UNI tunnel is decreased, reconstruction on the IP/MPLS control plane and the forwarding plane is reduced, and the forwarding performance is improved.

Embodiment 4

Figure 6:
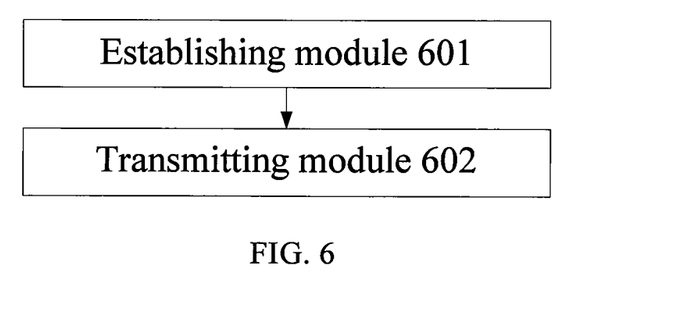
FIG. 6 is a schematic view of an optical network according to Embodiment 4 of the present invention.

Referring to FIG. 6, this embodiment of the present invention provides an optical network, which includes an establishing module 601 and a transmitting module 602.

The establishing module 601 is configured to establish an optical network tunnel between data communication devices.

The transmitting module 602 is configured to receive a service sent by a physical interface of a data communication device, and transmit the service to a peer data communication device.

Specifically, the optical network tunnel may be a GMPLS UNI tunnel.

Specifically, a link layer protocol includes a PPP or an Ethernet link layer protocol.

Specifically, the service includes a network protocol IP service and/or an MPLS service.

To sum up, in the optical network according to this embodiment of the present invention, after the optical network GMPLS UNI tunnel is successfully established, physical interfaces directly connected to the optical network in the data communication devices are triggered to start the link layer protocol. The data communication devices perform link layer negotiation through the optical network tunnel according to the link layer protocol. After link layer protocol negotiation is successfully performed, a link layer state between the data communication devices and a physical state of the physical interfaces are set to be valid. In this way, the forwarding of the IP/MPLS service is implemented, implementation complexity of bearing the IP/MPLS service over the GMPLS UNI tunnel is decreased, reconstruction on the IP/MPLS control plane and the forwarding plane is reduced, and the forwarding performance is improved.

To sum up, according to the technical solution provided in the embodiments of the present invention, on the data communication devices in the data communication network, an IP/MPLS module does not sense the GMPLS UNI tunnel on the control plane, and the IP/MPLS service may be born over the GMPLS UNI tunnel without any reconstruction. The technology of the GMPLS UNI tunnel is transformed into a basic link layer protocol. For the data communication device, the physical state of the physical interface directly connected to the optical network in the data communication device is set to be valid through the following three phases: (1) Optical signal receiving and transmitting of a physical layer is normal on; (2) the GMPLS UNI tunnel is successfully established; (3) an existing link layer protocol (such as PPP/ETHER) is successfully negotiated; and (3) is triggered by (2). After the three phases, the link layer state is set to be valid (the UP state), and the physical interface is available to IP/MPLS. The GMPLS UNI tunnel is not sensed, and the physical interface connected to the GMPLS UNI tunnel is used as a common physical interface.

Further, on the data communication device, the IP/MPLS module does not sense the GMPLS UNI tunnel on the forwarding plane. The forwarding performance of the IP/MPLS service is not affected due to the IP/MPLS service bearing over the GMPLS UNI tunnel. Because no forwarding table entry of the GMPLS UNI tunnel needs to be added on the forwarding plane, the forwarding performance is not affected.

During the integration of the data network and the optical network (that is IP+optical communications), through the method according to the embodiments of the present invention, a burden of the data communication device on the control plane is reduced, so that the data communication device can support a physical interface related to the GMPLS UNI tunnel faster and easier. At the same time, the problem that the forwarding performance of an IP/MPLS service is degraded due to the bearing of a new tunnel is solved on the forwarding plane of the data communication device.

In the embodiments of the present invention, the word "receive/receiving" may be understood as actively obtaining information from other modules or receiving information sent by other modules.

It should be understood by persons skilled in the art that the accompanying drawings are merely schematic views of preferred embodiments, and modules or processes in the accompanying drawings are not necessarily required in implementing the present invention.

It should be understood by persons skilled in the art that, modules in a device according to an embodiment may be distributed in the device of the embodiment according to the description of the embodiment, or be disposed in one or more devices different from this embodiment after changes. The modules in the embodiments may be combined into one module, or further divided into a plurality of sub-modules.

The sequence numbers of the embodiments of the present invention are merely for the convenience of description, and do not imply the preference among the embodiments.

A part of the steps of the method according to the embodiments of the present invention may be implemented by software. The software program may be stored in a computer readable storage medium such as a compact disk or a hard disk.

To sum up, the above descriptions are merely preferred embodiments of the present invention, but are not intended to limit the present invention. Any modification, equivalent replacement, or improvement made without departing from the spirit and principle of the present invention should fall within the scope of the present invention.

What is claimed is:

1. A method for implementing service forwarding, wherein at least two data communication devices communicate with each other through an optical network, the method comprising:
    establishing an optical network tunnel between the data communication devices;
    triggering physical interfaces directly connected to the optical network in the data communication devices to start a link layer protocol after the optical network tunnel is successfully established;
    performing, by the data communication devices, link layer negotiation through the optical network tunnel according to the link layer protocol;
    setting a link layer state between the data communication devices and a physical state of the physical interfaces to be valid after the link layer negotiation is successfully performed; and
    implementing, by the data communication devices, service forwarding through the optical network tunnel after the link layer state and the physical state of the physical interfaces are set to be valid.

2. The method according to claim 1, wherein the performing, by the data communication devices, the link layer negotiation through the optical network tunnel according to the link layer protocol comprises:
    sending, by a first data communication device, a link protocol request message through a physical interface of the first data communication device directly connected to the optical network;
    transmitting the link protocol request message to a second data communication device through the optical network tunnel;
    receiving, by the second data communication device, the link protocol request message through a physical interface of the second data communication device directly connected to the optical network, and sending a link protocol response message through the physical interface of the second data communication device directly connected to the optical network;
    transmitting the link protocol response message to the first data communication device through the optical network tunnel; and
    receiving, by the first data communication device, the link protocol response message through the physical interface of the first data communication device directly connected to the optical network.

3. The method according to claim 2, wherein the implementing, by the data communication devices, the service forwarding through the optical network tunnel comprises:
    sending, by the first data communication device, a service to the optical network tunnel through the physical interface of the first data communication device, and transmitting the service to the second data communication device through the optical network tunnel; and
    receiving, by the second data communication device, the service through the physical interface of the second data communication device directly connected to the optical network, wherein the second data communication device is a next hop data communication device of the first data communication device.

4. The method according to claim 2, further comprising:
    setting the physical state of the physical interfaces to be invalid when the optical network tunnel becomes faulty.

5. The method according to claim 2, wherein the establishing of the optical network tunnel between the data communication devices comprises:

initiating, by the first data communication device, an optical network tunnel establishing request, to the optical network through the physical interface of the first data communication device directly connected to the optical network according to a user configuration and/or a service trigger, wherein the request carries information such as an identifier of the second data communication device, a bandwidth, and a Quality of Service (QoS) parameter;

receiving, by the optical network, the optical network tunnel establishing request, and establishing an optical path between the first data communication device and the second data communication device according to the information carried in the request; and establishing, by the first data communication device, the optical network tunnel between the first data communication device and the second data communication device according to the optical path.

6. The method according to claim 2, wherein the link layer protocol comprises:
a Point-to-Point Protocol (PPP) or an Ethernet link layer protocol.

7. The method according to claim 2, wherein the service comprises:
a network protocol Internet Protocol (IP) service and/or a Multi-Protocol Label Switching (MPLS) service.

8. The method according to claim 1, wherein the implementing, by the data communication devices, the service forwarding through the optical network tunnel comprises:
sending, by the first data communication device, a service to the optical network tunnel through the physical interface of the first data communication device, and transmitting the service to the second data communication device through the optical network tunnel; and
receiving, by the second data communication device, the service through the physical interface of the second data communication device directly connected to the optical network, wherein the second data communication device is a next hop data communication device of the first data communication device.

9. The method according to claim 3, wherein before the sending, by the first data communication device, the service to the optical network tunnel through the physical interface of the first data communication device, the method further comprises:
receiving, by the first data communication device, the service sent by a previous hop data communication device of the first data communication device, wherein the previous hop data communication device knows that the physical state of the physical interface of the first data communication device is valid by searching a forwarding table of the previous hop data communication device, and sends the service to the first data communication device.

10. The method according to claim 1, further comprising: setting the physical state of the physical interfaces to be invalid when the optical network tunnel becomes faulty.

11. The method according to claim 1, wherein the establishing of the optical network tunnel between the data communication devices comprises:
initiating, by the first data communication device, an optical network tunnel establishing request, to the optical network through the physical interface of the first data communication device directly connected to the optical network according to a user configuration and/or a service trigger, wherein the request carries information such as an identifier of the second data communication device, a bandwidth, and a Quality of Service (QoS) parameter;

receiving, by the optical network, the optical network tunnel establishing request, and establishing an optical path between the first data communication device and the second data communication device according to the information carried in the request; and establishing, by the first data communication device, the optical network tunnel between the first data communication device and the second data communication device according to the optical path.

12. The method according to claim 1, wherein the link layer protocol comprises:
a Point-to-Point Protocol (PPP) or an Ethernet link layer protocol.

13. The method according to claim 1, wherein the service comprises:
a network protocol Internet Protocol (IP) service and/or a Multi-Protocol Label Switching (MPLS) service.

14. A system for implementing service forwarding, comprising: a first data communication device and a second data communication device, wherein the first data communication device and the second data communication device communicate with each other through an optical network;
the first data communication device being configured to establish an optical network tunnel between the first data communication device and the second data communication device; trigger a physical interface of the first data communication device directly connected to the optical network to start a link layer protocol after the optical network tunnel is successfully established; perform link layer negotiation with the second data communication device through the optical network tunnel according to the link layer protocol; set a link layer state and a physical state of the physical interface to be valid after the link layer negotiation is successfully performed; and send a service to the optical network tunnel through the physical interface after the link layer state and the physical state of the physical interface are set to be valid; and
the second data communication device being configured to establish the optical network tunnel between the second data communication device and the first data communication device; trigger a physical interface of the second data communication device directly connected to the optical network to start the link layer protocol after the optical network tunnel is successfully established; perform the link layer negotiation with the first data communication device through the optical network tunnel according to the link layer protocol; set the link layer state and the physical state of the physical interface of the second data communication device to be valid after the link layer negotiation is successfully performed; and receive the service transmitted by the optical network tunnel through the physical interface of the second data communication device after the link layer state and the physical state of the physical interface are set to be valid.

15. The system according to claim 14, further comprising an optical network, wherein
the optical network is configured to establish the optical network tunnel between the first data communication device and the second data communication device; and receive the service sent over the physical interface of the first data communication device, and transmit the service to the second data communication device.

16. A data communication device, comprising:
- an establishing module, configured to establish an optical network tunnel between the data communication device and a peer data communication device;
- a starting module, configured to trigger a physical interface of the data communication device directly connected to an optical network to start a link layer protocol after the establishing module successfully establishes the optical network tunnel;
- a negotiating module, configured to perform link layer negotiation with the peer data communication device through the optical network tunnel established by the establishing module according to the link layer protocol started by the starting module;
- a setting module, configured to set a link layer state and a physical state of the physical interface to be valid after the link layer negotiation is successfully performed by the negotiating module; and
- a sending module, configured to send a service to the optical network tunnel through the physical interface after the link layer state and the physical state of the physical interface are set to be valid by the setting module.

17. The data communication device according to claim 16, further comprising:
- a receiving module, configured to receive the service transmitted by the optical network tunnel established by the establishing module through the physical interface set by the setting module.

* * * * *